United States Patent [19]

Mairy

[11] 4,136,952
[45] Jan. 30, 1979

[54] MEASURING THE SURFACE TEMPERATURE OF A BODY

[75] Inventor: Bernard Mairy, Andene, Belgium

[73] Assignee: Centre de Recherches Metallurgiques-Centrum Voor Research in de Metallurgie, Brussels, Belgium

[21] Appl. No.: 787,487

[22] Filed: Apr. 14, 1977

[30] Foreign Application Priority Data

Apr. 14, 1976 [BE] Belgium .............................. 840761
Nov. 17, 1976 [BE] Belgium .............................. 848455

[51] Int. Cl.² ........................ G01N 1/34; G01J 5/60
[52] U.S. Cl. ................................ 356/36; 73/355 R; 356/44
[58] Field of Search ............... 356/44, 36; 73/355 R, 73/355 EM; 29/81 G, 81 H, 81 J; 51/55; 15/236 C

[56] References Cited

U.S. PATENT DOCUMENTS

| | | | |
|---|---|---|---|
| 3,331,114 | 7/1967 | Neufelder | 15/93 R |
| 3,559,485 | 2/1971 | Hovis et al. | 73/355 R |
| 3,903,658 | 9/1975 | Daiuta | 51/55 |

FOREIGN PATENT DOCUMENTS

| | | | |
|---|---|---|---|
| 822744 | 9/1974 | Belgium | 73/355 R |
| 141004 | 8/1961 | U.S.S.R. | 73/355 R |

Primary Examiner—John K. Corbin
Assistant Examiner—Wm. H. Punter
Attorney, Agent, or Firm—Holman & Stern

[57] ABSTRACT

The surface temperature of a body is measured by receiving thermal radiation from a given zone of the surface of the body along a given optical path by means of a sighting instrument. At least that part of the optical path which is adjacent the instrument is protected by means of a shield. The given zone is subjected to a scraping operation.

14 Claims, 7 Drawing Figures

MEASURING THE SURFACE TEMPERATURE OF A BODY

Method of and apparatus for measuring the surface temperature of a body, particularly a metal ingot.

FIELD OF THE INVENTION

The present invention relates to a method of and an apparatus for measuring the surface temperature of a body, and particularly for continuously measuring the surface temperature of a metal strand obtained by continuous casting.

BACKGROUND OF THE INVENTION

The problems connected with measuring the surface temperature of high temperature bodies, for example in the temperature range of from 500° C. to 2000° C., have mostly been solved by well known pyrometric techniques, and in particular by optical pyrometry.

When temperatures are measured under favorable conditions, for example when on the optical path used for the measurement no disturbance whatsoever is found, the results of the said measurements actually correspond to the qualities to be measured.

However, this is not the case when measurements are to be made in an environment the atmosphere of which comprises disturbing components possibly in variable amounts such as powders of any kind, vapors (for example steam), and various mists. The presence of such components on the path of the pyrometric optical measurement necessarily leads to alterations which affect to a greater or lesser extent the accuracy of the results obtained and also prevent them from being reproducible.

When one finds oneself in similar conditions, the remedy is obviously to eliminate as far as possible in any measurement these disturbing components and to suppress the causes governing their production.

Frequently, however, temperatures have to be measured in places where the production or the passage of disturbing components, such as powders and coolant projections, and the presence of an oxide layer, are fundamental aspects of the phenomenon in question, or are even the conditions for this phenomenon taking place correctly. In this case, it is not possible to eliminate the disturbance elements without modifying the process taking place; the problem of measuring the temperature is then solved in an unsatisfactory manner.

To the knowledge of the applicants, there is not in existence up to now a valuable method for measuring the real temperature under difficult operational conditions such as those mentioned above.

OBJECT OF THE INVENTION

An object of the present invention is to provide a method of measuring the surface temperature by sighting the body the temperature of which is to be measured, the method making it possible to avoid drawbacks due to the presence of an inevitable disturbing atmosphere, i.e., an atmosphere necessary in the immediate surroundings of the sighting place or zone, and those due to the presence of an unwanted layer (for example an oxide layer) on the surface of the body in the zone where one wishes to measure the temperature.

SUMMARY OF THE INVENTION

The method according to the present invention, in which surface temperature is measured by means of a sighting instrument and in which the optical path of the said instrument is protected by means of a suitable shield, on at least a portion of the said path starting from the sighting device, is essentially characterized in that the zone where the temperature has to be measured is subjected to a scraping operation by means of a scraping member; this operation leaving the zone in question free of any parasitic element or layer masking its healthy surface in the field or range of the sighting instrument used for measuring the temperature.

In the present specification, the term "scraping" should be understood in its widest scope and signifies any way of removing, such as scraping, a parasitic layer, e.g oxide formed on the body, in particular a strand emerging from a continuous casting mold.

According to an advantageous manner of carrying out the method of the invention, scraping of the zone in question is carried out in a continuous way by means of a friction member consisting of a hard material (for example stellite or a composite material for example comprising a stellite support in which is contained an extra-hard material such as a small plate of suitable form, of tungsten carbide or the like) kept in contact with the said zone, which it completely sweeps according to a preferably periodical movement.

In the case where the zone to be scraped is also subjected to displacement, friction members are advantageously subjected to a possibly curved to and fro movement, or even to a circular movement, the diameter of which extends across practically the entire width of the region to be cleaned. This latter mode permits greater regularity in cleaning the regions.

It has also been found to be advantageous to adjust by a suitable means the pressure of the friction members against the zone so as to correlate it to the hardness of the metal of which the said zone is made, and to the speed of displacement of the friction member with respect to the said zone.

In this manner, on the one hand, the process being carried out about the sheath is not modified, and is prevented from disturbing the measurement of the temperature, complete isolation of the sighted zone being also easily effected owing to a non-oxidizing gaseous stratum which is easily applied in a perfect manner to any kind of local configuration of the sighted object.

In the particular case where the above described method is applied to measure the surface temperature of a metal strand emerging from a continuous casting mold, the optical path of sighting can be displaced together with the ingot so as to aim at the same point of the strand for a given time.

An object of the invention is also to provide automatic carrying out of the method described above. For example, the putting into operation of the scraping apparatus is subordinated to the arrival of a cast strand (not the dummy bar) in the scanning range; withdrawal of the scraping apparatus must be ensured in time before the end of the casting and in the case of substantial slowing down or stopping of the casting.

The present invention also relates to for use in the above described method.

The apparatus according to the present invention, which is especially applicable to a high temperature strand emerging from a continuous casting mold, is essentially characterized in that it comprises a tubular frame, in which a shaft is mounted for rotation, one of the ends of the shaft being connected to a motor adapted to rotate the said shaft in the tubular frame, the other end of the shaft having a member which serves as a support for one or several scraping members adapted to enter into contact with the zone to be cleaned during the rotation of the shaft.

According to a preferred embodiment, the apparatus further comprises means for regulating the pressure exerted by the scraping member on the zone, and means for cooling and sweeping the space between the shaft and the frame and the rotary head either at its periphery, or at its center.

The motor rotating the shaft is preferably a pneumatic motor for flexibility reasons. The means for regulating the pressure of the scraping members against the zone can be applied either to the scraping members or to the head, or directly to the rotating shaft, but they are preferably applied to the scraping members so as to permit the latter to adapt themselves more easily to the flatness faults of the zone to be cleaned.

The above described apparatus is advantageously combined with a temperature measuring device for measuring the temperature of the zone in question, the device being arranged in such a way as to scan the already cleaned zone; in a preferred embodiment of the apparatus according to the invention, the scanning is effected within the rotating shaft by means of an optical fiber one end of which is disposed close to the zone in question and its other end is in optical connection with a measuring pyrometer.

The invention will be described further, by way of example only, with reference to the accompanying drawings:

DESCRIPTION OF PREFERRED EMBODIMENTS

Figure 1:
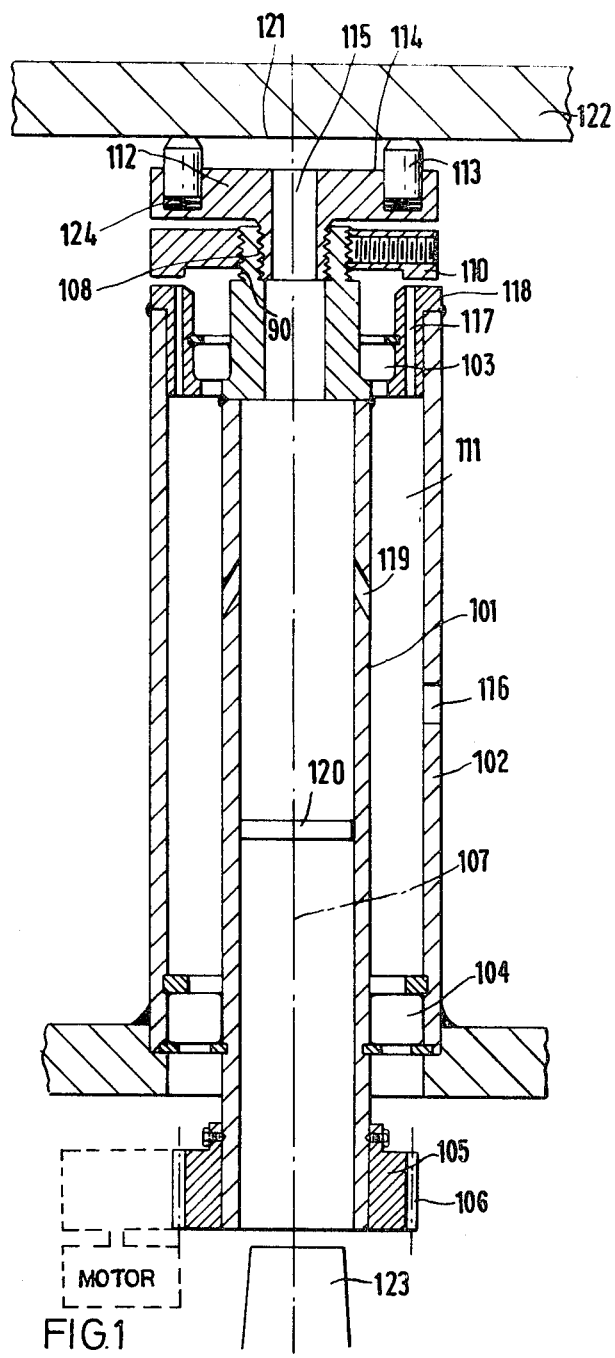
FIG. 1 is a longitudinal cross-section through one embodiment of apparatus for use in measuring the surface temperature of a continuously cast strand.

The apparatus illustrated in FIG. 1 comprises a hollow rotatable shaft 101 mounted in a fixed barrel 102 by means of two bearings 103 and 104. The rear part fixed the shaft 101 extends beyond the barrel 102 and on it is of a collar 105 having outer teeth 106, the collar 105 being rotated about the axis 107 of the shaft 101 by a pinion or a toothed wheel (shown in FIG. 1 as a dotted line) driven, in turn, by a suitable pneumatic motor.

The front part of the shaft 101 has an end provided with an internally screw-threaded portion 108 and an externally screw-threaded portion 90, the outer screw-thread serving to fix by screwing a cap 110 adapted to protect the bearing 103 and to partly close the conduit 111 between the shaft 101 and the barrel 102. The internal screw-thread 108 serves to fix a head 112 carrying scraping members 113 to the shaft 101.

The scraping members 113 are disposed spaced at 120° from one another in a plate 114 on the head 112. The head 112 also has an axial bore 115. By means of an orifice 116 formed in the wall of the barrel 102, a cooling fluid is blown into the tubular space between the shaft 101 and the barrel 102. This fluid cools the barrel and is discharged through ports 117 formed in an end ring 118 fixing the fluid - tight bearing 103. The fluid then flows between the end ring 118 and the cap 110 to be discharged into the atmosphere. A part of the fluid flows through openings 119 formed in the shaft 101 and inclined towards the front end of the shaft. The fluid is evacuated through the axial conduit 115 even during rotation of the shaft. A transparent disc 120 fixed upstream of the orifices 119, prevents the fluid from being evacuated through the rear end of the shaft, while permitting visual observation of a portion of the zone 121 of the object 122 scraped by the scraping members 113 consisting of stellite. (The transparent disc could also be disposed downstream of the orifices 119, in which case it must be associated with a lateral protection device for protecting the space between the head of the scraping device and the surface to be scraped.) Optical measurement of the temperature is possible by using a pyrometer 123 located on the axis 107 of the shaft 101. The scraping members 113 are held against the surface of the article or product 122 by means of suitable resilient element such as Belleville washers 124.

Figure 2:
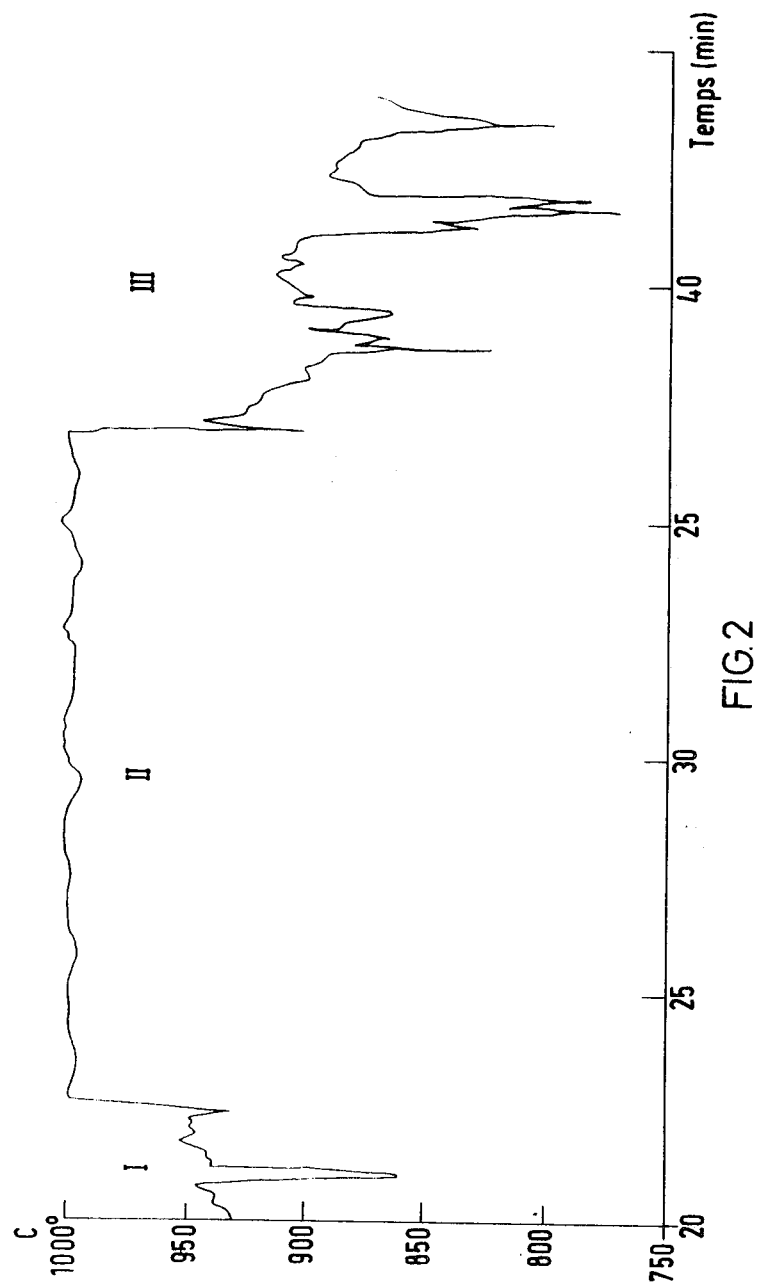
FIG. 2 is a graph of measured surface temperature against time.

FIG. 2 is a diagram illustrating temperatures measured against time when scanning, according to a fixed direction, a succession of zones first not scraped (I), then scraped (II), and again not scraped (III). This diagram clearly shows the importance of the method according to the invention which makes it possible to obtain more accurate and more regular measurements of the temperature of a product being displaced.

According to a particularly preferred embodiment of the apparatus according to the invention, the apparatus comprises an easily mountable and removable head which is adapted to swivel like a kneecap (to a certain extent) at the end of the rotating shaft supporting the said head.

According to a further embodiment, the rotating shaft which is substantially externally cylindrical is provided at its end on the scraping side with a peripheral circular groove having a suitable depth. This groove is adapted to locate a resilient or non-resilient blocking ring which after positioning in the groove preferably does not extend beyond the rotating shaft.

The head is removable and coaxial with the shaft and carries one or several scrapers at its front face, the said head being provided at its rear face with at least two arms substantially parallel to the axis of the shaft, the arms being shaped so that, after positioning of the rear face of the head against the end face of the shaft, the end of the said arms arranged in a suitable longitudinal slot formed in the shaft, has a radial extension greater than that of the inner part of the blocking ring and is more far away than the said ring from the end of the shaft, which prevents the head from being removed till the ring is in position.

According to an advantageous variant of this embodiment, the said arms have transverse dimensions considerably smaller than the transverse dimensions of the longitudinal slot in which they are located, which makes it possible for the head to be displaced with a given amount to play with respect to the shaft after assembling.

Moreover, according to this embodiment the rear face of the head and/or the end face of the shaft are substantially spherical, slightly convex, for example with a large diameter, the said head having an axial through hole arranged opposite to that formed in the shaft.

As already mentioned above, in practice the number of arms is advantageously three, the arms being arranged substantially at 120° from one another and the scrapers disposed in front of the head are also three in number and disposed substantially at 120° from one another but each spaced at 60° with respect to the arms. The angular distances between each arm and the scrapers are preferably not equal to 120°, on the one hand, to allow the head to be adjusted on the shaft with no need of making attempts and be permanently oriented in the same way and, on the other hand, to permit sweeping of certain zones scraped on the strand after complete passage of the head.

Figure 3:
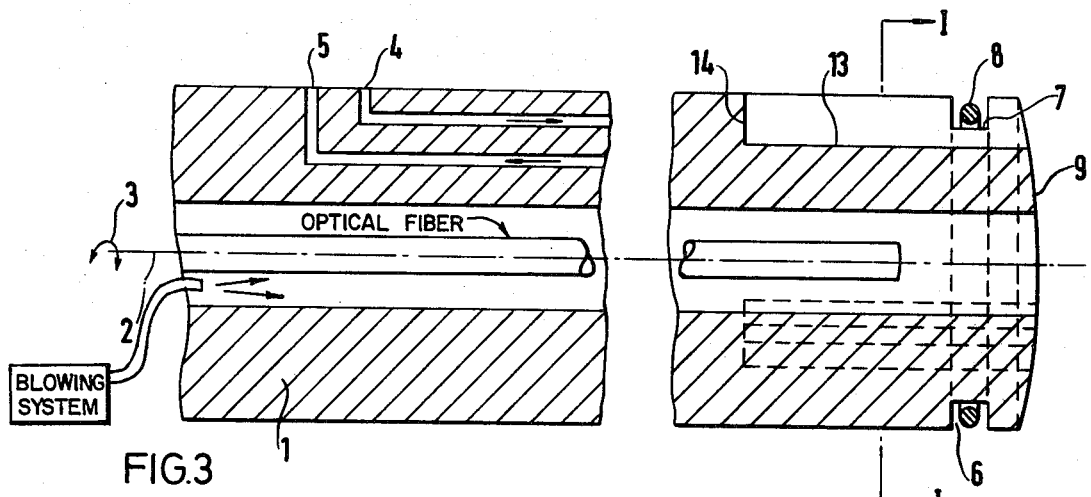
FIG. 3 is a longitudinal cross-section through a shaft of another embodiment of apparatus for use in measuring the surface temperature of a continuously cast strand.

Advantageously and in order to reduce the external radial dimension of the shaft, the water cooling circuit usually arranged at its periphery does not comprise a return path, the cooling water entering the rear of the shaft is discharged at a small distance from the front face of the shaft according to a suitable direction so as not to affect the observation In FIG. 3, the hollow shaft 1, adapted to rotate about its axis 2, can effect an alternating movement indicated by a curved arrow 3. A water cooling system is diagrammatically indicated by 4 and 5 which are the inlet and the outlet of the cooling circuit. A blowing system (indicated in block form) permits blowing of a suitable gas at a suitable pressure through the cavity of the shaft and of the head so as to reach contact with the strand.

Figure 4:
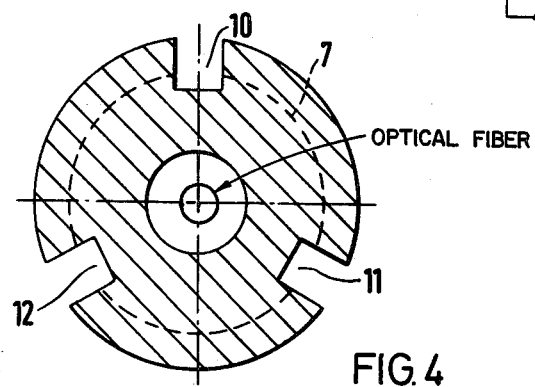
FIG. 4 is a section on line I-I in FIG. 3.

The front part of the shaft has an outer circular groove 6 whose depth is delimited by the bottom 7. This groove locates a tightening ring 8 which after its positioning does not extend beyond the groove. The front part of the shaft which terminates with a slightly convex front face 9 also comprises (see FIG. 4) three slots 10, 11 12 extending in the longitudinal direction of the shaft on its periphery and substantially at 120° from one another; the depth of the longitudinal slots (delimited by the level 13) is considerably greater than that of the circular groove 6, which is thus interrupted at the crossing areas with the three longitudinal slots which terminate at a point 14 substantially further away from the face 9 than the circular groove.

Figure 5:
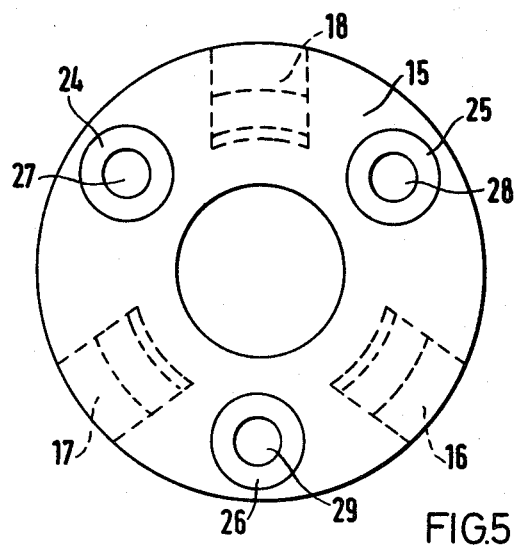
FIGS. 5 and 6 are respectively a front view and a side view of a scraping head to be fitted on the shaft of FIG. 3.
Figure 6:
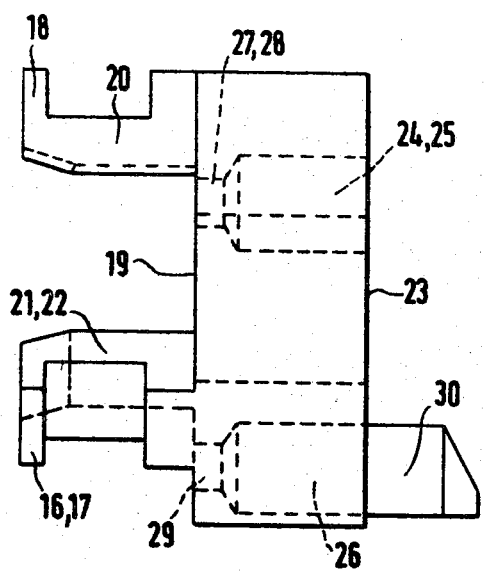

FIGS. 5 and 6, as mentioned above, illustrate a scraping head comprising a support 15 having three feet 16, 17, 18 disposed beyond the support, the dimensions and the relative peripheral position of the feet being such that they can simultaneously enter the three slots 10, 11, 12 until the rear face 19 of the support abuts against the face 9 of the shaft. At this point, the three feet are fully inserted into the three slots 10, 11, 12, the ring 8 having been previously removed from the groove 6 when the head was put on the shaft. The three feet 16, 17, 18 and the three arms 20, 21, 22 which connect the feet to the support 15 have dimensions so that, on the one hand, the arms can be displaced with large play between the levels 7 and 13, and, on the other hand, the feet have radial dimensions practically equal to those of the ring 8. In this way, after having placed the ring 8 back in position in its groove, it is no longer possible to remove the head, which owing to the play allowed and to the bulged face 9 may have a certain degree of flexibility or can assist the orientation at the tip of the shaft in order to fit or adapt itself at three points to the surface to be cleaned regardless of the lack of regularity and flatness of the surface.

The front face 23 of the head has three seats 24, 25, 26 each of which has an outlet 27, 28, 29 on the back of the head, each substantially angularly spaced by 60° with respect to a foot. Each seat locates a scraping member 30, (31, 32) consisting of a hard material (for example stellite). After utilization, the scraping members can be removed out of the seats thanks to the presence of the bores 27, 28, 29.

Figure 7:
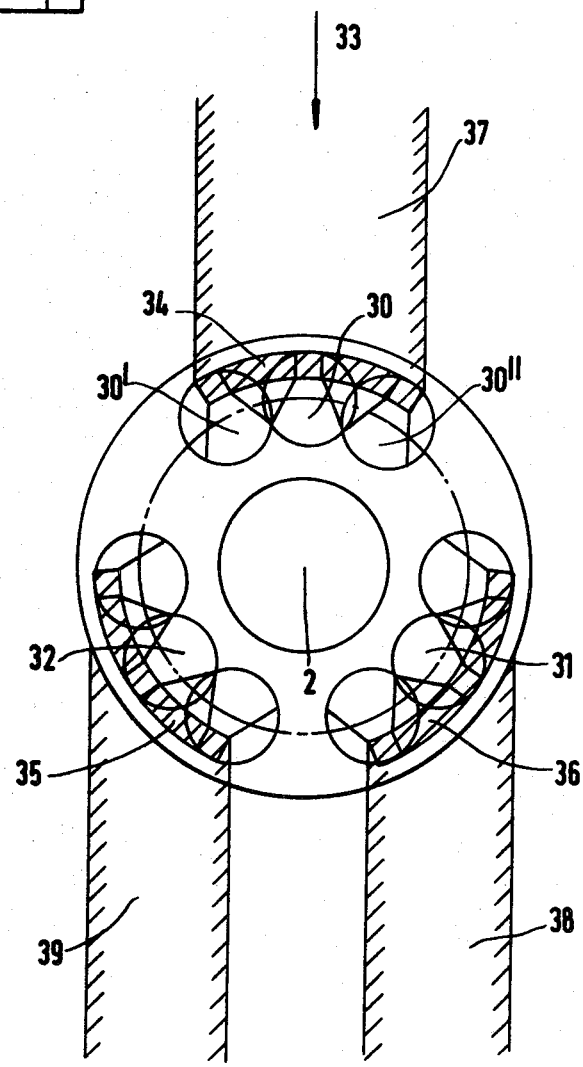
FIG. 7 is a front view of the scraping head, which is provided with three scraping members whose trajectories are indicated diagrammatically.

FIG. 7 illustrates the front face 23 of the head provided with three scraping members 30, 31, 32 and disposed in front of a strand being displaced for example in the direction of the barrel 33. This FIGURE illustrates by solid lines the three scraping members in their median positions and by dashed lines (positions 30' and 30'') the end positions they occupy during the alternating movement, for example 60°, to which the shaft 1 is subjected about its axis 2.

During these movements the scraping faces sweep respective surfaces 34, 35 and 36 which, by suitably choosing the speed of rotation of the shaft and the forward movement of the strand, makes it possible for the scraper 30 to sweep the zone 37 of the surface of the strand and for the scraping members 31 and 32 to sweep the zones 38 and 39, the other two scraping members only serving to ensure planerity of contact of the head, or possibly to "finish" the descaling operation at the ends of the zone 34 which might not have been effected by the scraping member 30 (the scale generally present in the form of "pustules" bursts when the scraping member touches it). The two zones 38 and 39 cut the zone 37 which makes it possible to obtain on this face of the ingot a surface perfectly cleaned from scale. The presence of a scraping member such as member 30, just on the side from where the strand comes, makes it possible to have available a central already cleaned zone when it passes across the sighting axis in the cavity of the shaft.

I claim:
1. Apparatus for measuring the temperature of a surface of a body moving past the apparatus, comprising:
   a tubular frame;
   a shaft mounted for rotation about an axis in the tubular frame;
   a motor connected to one end of the shaft and adapted to rotate the shaft in the tubular frame;
   a support provided on the other end of the shaft;
   at least one scraping member mounted on the support, the at least one scraping member being spaced from the axis of rotation of the shaft and contacting a given zone of the surface of the moving body while the shaft is being rotated; and
   a sighting instrument for measuring the surface temperature of the given zone, the at least one scraping member and the sighting instrument being disposed in such a way as to permit sighting of the already scraped middle portion of the given zone.
2. The apparatus of claim 1, further comprising means for regulating the pressure of the at least one scraping member against the given zone, and means for cooling and sweeping the space between the shaft and the frame and the rotating head.
3. The apparatus of claim 1, wherein the said motor is a pneumatic motor.
4. The apparatus of claim 2, wherein the means for regulating the pressure of the at least one scraping mem- ber against the given zone acts directly on the at least one scraping member.

5. The apparatus of claim 1, further comprising an optical fiber extending axially of the rotatable shaft, whereby sighting can be effected through the rotatable shaft by means of the optical fiber.

6. The apparatus of claim 1, wherein the shaft comprises, at its scraping end, a peripheral groove serving as a seat for a blocking ring; the support being a removable, axially hollow head, coaxial with the shaft and carrying the at least one scraping member on its front face, being provided, on its rear face, with at least two arms substantially parallel to the axis of the shaft, and being shaped in such a way that, after the rear face of the head has been positioned against the end face of the shaft, the end of each of the said arms has, while being mounted in a respective longitudinal slot formed in the shaft, a radial dimension greater than the internal radius of the blocking ring and is at a greater distance from the end of the shaft than the said ring.

7. The apparatus of claim 6, wherein the dimensions of the ring are such that after its positioning in the groove, the dimensions of the ring do not exceed that of the shaft.

8. The apparatus of claim 6, wherein each arm has transverse dimensions considerably smaller than the transverse dimensions of the longitudinal groove in which it is located.

9. The apparatus of claim 6, wherein the rear face of at least one of the head and the end of the shaft is slightly convex.

10. The apparatus of claim 6, including a peripheral water cooling device.

11. The apparatus of claim 6, further comprising means for supplying a cooling gaseous current through the axial cavity of the shaft.

12. The apparatus of claim 6, wherein there are three said scraping members.

13. The apparatus of claim 6, wherein the arms are three in number and are spaced substantially 120° from one another.

14. The apparatus of claim 13, wherein the arms are spaced about 60° from the scraping members.

* * * * *